United States Patent [19]

Tsai-Chuan

[11] Patent Number: 4,966,211
[45] Date of Patent: Oct. 30, 1990

[54] ADJUSTABLE TIRE CHAIN

[76] Inventor: Lu Tsai-Chuan, 2, Lane 176, Tung-Yi Rd., Chiayi City, Taiwan

[21] Appl. No.: 352,995

[22] Filed: May 17, 1989

[51] Int. Cl.⁵ .................. B60C 27/20; B60C 27/06
[52] U.S. Cl. ............................ 152/225 R; 152/216
[58] Field of Search ............... 152/221, 225 R, 225 C, 152/179, 213 R, 213 A, 220, 242, 216

[56] References Cited

U.S. PATENT DOCUMENTS

| | | | |
|---|---|---|---|
| 2,562,798 | 7/1951 | Kovatch | 152/242 |
| 3,476,167 | 11/1969 | Kitsopoulos | 152/225 R |
| 4,165,774 | 8/1979 | Matsui | 152/221 |
| 4,476,907 | 10/1984 | Odawara | 152/225 R |

Primary Examiner—Michael W. Ball
Assistant Examiner—Gregory J. Wilber
Attorney, Agent, or Firm—Larson & Taylor

[57] ABSTRACT

An improved tire chain consisting of two side ropes, a plurality of crosswise bent bars set properly spaced apart between the two side ropes, a connector, a metal chain to be added supplementarily to prolong the side ropes to suit to a larger tire, and auxiliary crosswise bent bars possible to be added together with the metal chain to supplement the anti-slippery force of the prolonged section.

3 Claims, 5 Drawing Sheets

ADJUSTABLE TIRE CHAIN

BACKGROUND OF THE INVENTION

A tire chain is generally used for a car to prevent the car from slipping when it runs on a snow-covered road, and is usually definite in its length so as to be used for only one size of a tire. Therefore, a maker has to make various sizes of tire chains to suit to different sizes of tires, and a user has to know the diameter and the width of the tire to be covered with a tire chain.

SUMMARY OF THE INVENTION

The object of this invention is to provide a tire chain with a versatility to suit it to any size of a tire including the width and the diameter, possible to be altered in the length and to supplementarily add auxiliary crosswise bent bars so as to secure the fixing force against the tire to prevent the tire from slipping.

This improved tire chain comprises two side ropes to go around the two side edges of a tire, a plurality of crosswise bent bars having both their ends linked with the two side ropes so as to lie crosswise on the circumferential surface of a tire, a connector, a metal chain to be added supplementarily to prolong the two side ropes to suit to a larger tire when said side ropes are not long enough to go around, and auxiliary crosswise bent bars to be added additionally in the section prolonged by the metal chain between the side ropes.

The two side ropes are made of flexible steel wire or the like and each has an eye at each end.

The crosswise bent bars are bent like waves having at least a protruding section to protrude up on the circumferential surface of a tire and both ends pinched firmly on the side ropes by means of short tubes.

The auxiliary crosswise bent bars are shaped as said crosswise bent bars, but its both ends can pass through the eye of a link of the metal chain so as to combine the auxiliary crosswise bent bars with the metal chain to supplement the anti-slippery force of the prolonged section, in case the metal chain is supplementarily added to it.

BRIEF DESCRIPTION OF THE DRAWINGS

This invention will now be described in detail with reference to accompanying drawings wherein.

DETAILED DESCRIPTION OF THE INVENTION

Figure 1:
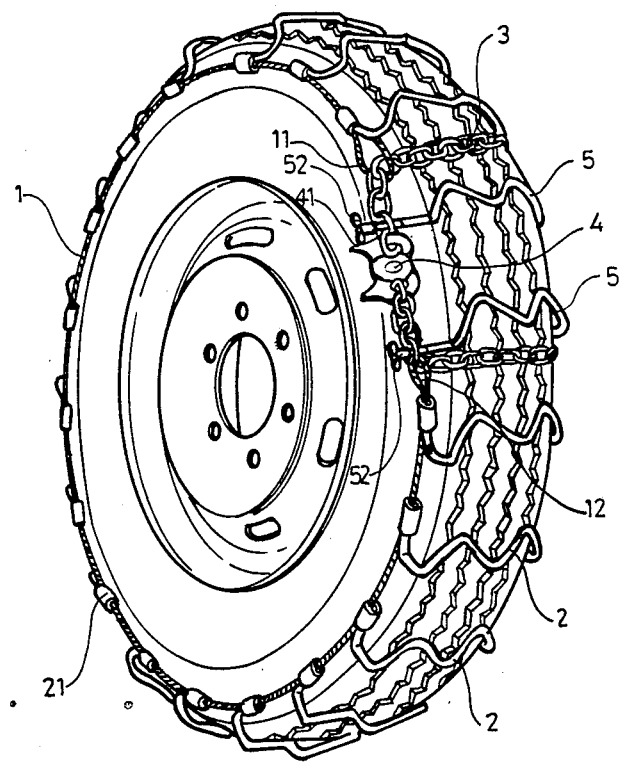
FIG. 1 is a perspective view of the improved tire chain applied to a tire in accordance with the present invention.

The improved tire chain in accordance with the present invention, as shown in FIG. 1, comprises two side ropes 1, a plurality of crosswise bent bars 2, a metal chain 3, a plurality of auxiliary crosswise bent bars 5, and a connector 4 as its main parts.

The side ropes 1 made of flexible wires or other flexible materials are to be placed around both the side edges of a tire. Each side rope 1 has a rope eye 11 or 12 at both ends and a plurality of crosswise bent bars 2 are connected between the two ropes 1 properly spaced apart and to be laid crosswise on the circumferential surface of a tire.

Figure 2:
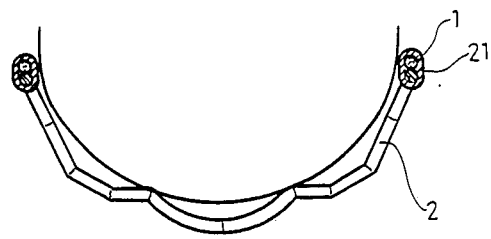
FIG. 2 is a cross-sectional view taken along line 2—2 of FIG. 3.
Figure 3:
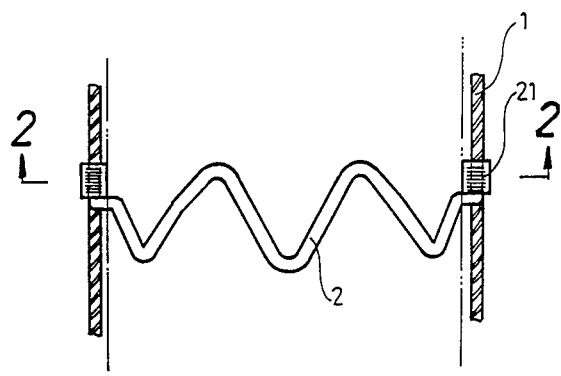
FIG. 3 is a front view of the improved tire chain used on a tire in accordance with the present invention.
Figure 4:
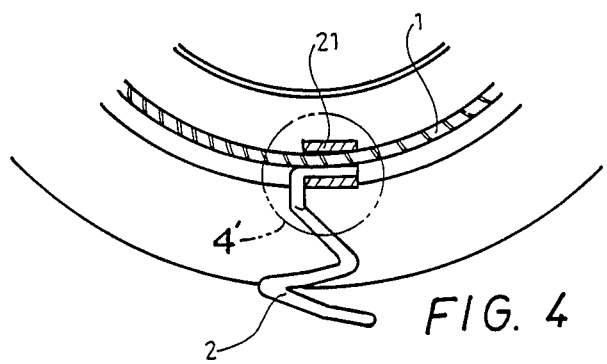
FIG. 4 is a side view of the improved tire chain used on a tire in accordance with the present invention.
Figure 4:
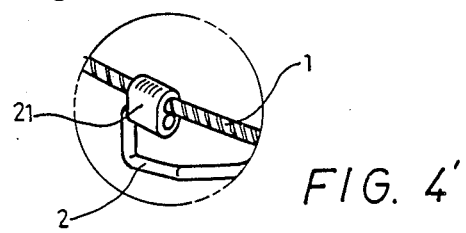

The crosswise bent bars 2 are bent like waves, as shown in FIGS. 2, 3, and 4, having at least a protruding section to protrude up when they are laid on the circumferential surface of a tire. Each bar 2 has both its ends pinched firmly on the side ropes 1 by means of short tubes 21, and thus is assembled firmly together with the side ropes 1.

In case the side ropes 1 are not long enough to go around a tire, the metal chain 3 can be additionally used to prolong the side ropes 1, being set to pass through the four rope eyes 11, 12 of the two side ropes 1 laid across the circumferential surface of the tire and linked with the connector 4. Metal chain 3 is made of a plurality links, and crosses the circumferential surface of the tire twice.

Figure 5:
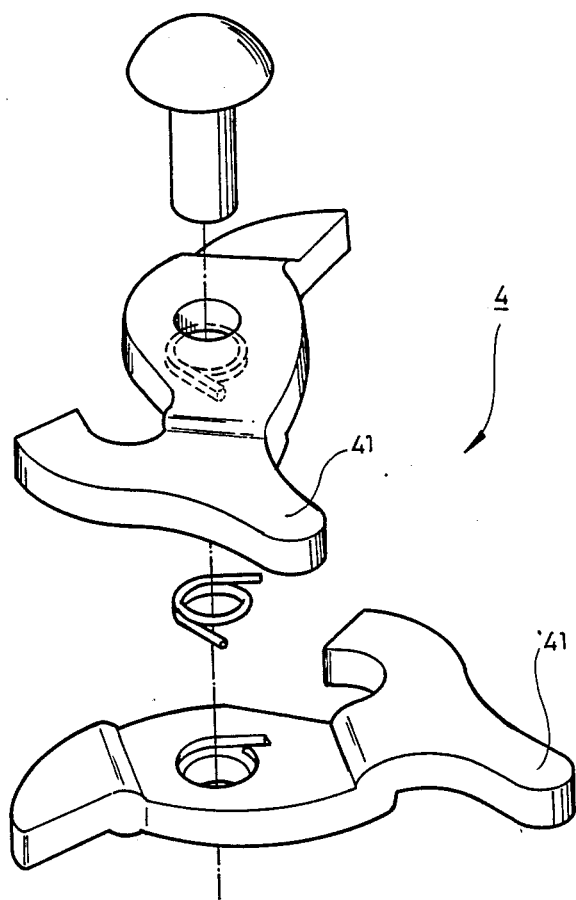
FIG. 5 is an exploded perspective view of the connector in accordance with the present invention.
Figure 6:
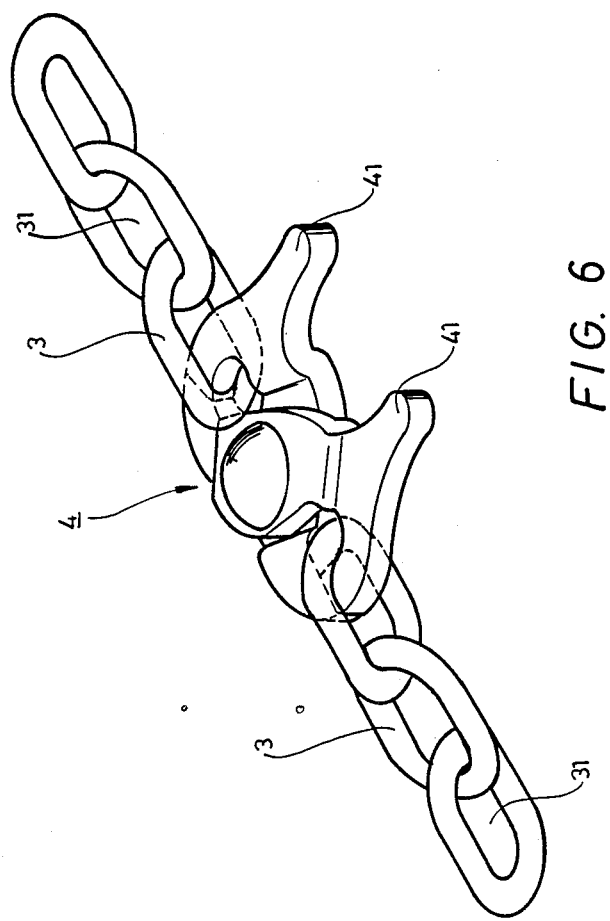
FIG. 6 is a perspective view of the connector in practical use in accordance with the present invention.
Figure 7:
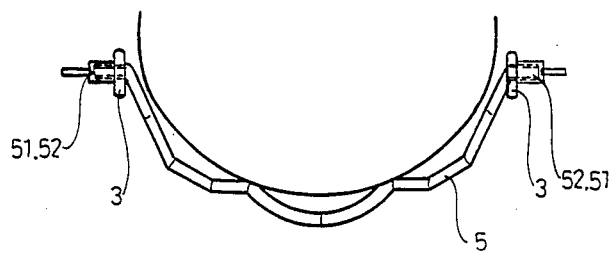
FIG. 7 is an upside view of the auxiliary crosswise bent bar in accordance with the present invention.
Figure 8:
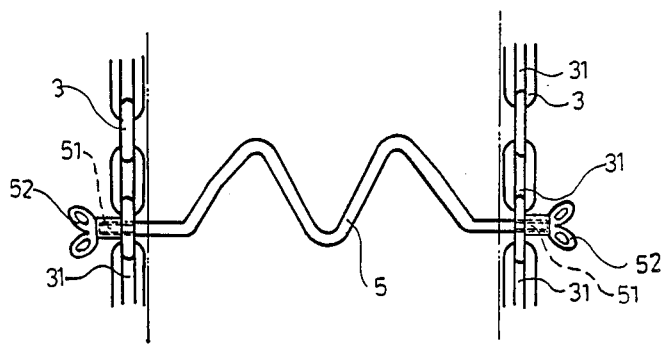
FIG. 8 is a front view of the auxiliary crosswise bent bar in accordance with the present invention.
Figure 9:
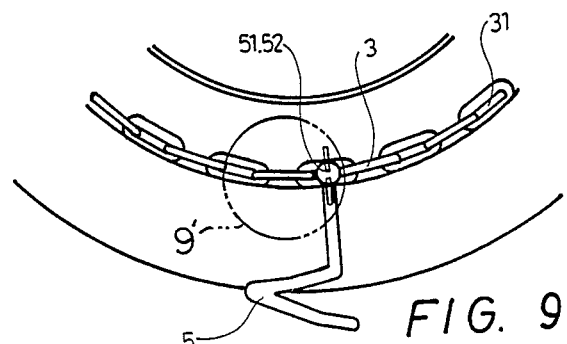
FIG. 9 is a side view of the auxiliary crosswise bent bar in accordance with the present invention.
Figure 9:
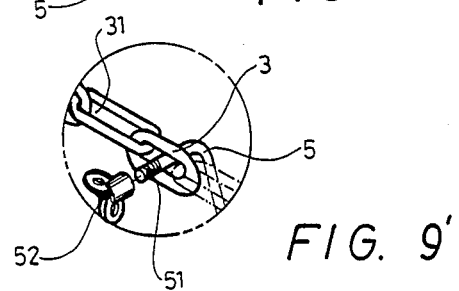

The connector 4 consisting of two pieces as shown in FIGS. 5 and 6, has a grip 41 in each piece so that the connector may be easily opened by pressing the two grips 41 toward one another.

The auxiliary crosswise bent bars 5 can be supplementarily added in the prolonged section where the metal chain 3 is added to supplement the fixing force of this tire chain against the tire, as there are no crosswise bent bars 2 in said prolonged section.

The auxiliary crosswise bent bars 5 shown in FIGS. 1, 7, 8 and 9 have a similar shape as the crosswise bent bars 2, having also at least a protruding section, but its both ends have a threaded portion 51. In order to fix the threaded portion 51 through the eyes 31 of the links of the chain 3 for assembling the auxiliary crosswise bent bars 5 with the chain 3, the bars 5 have to be screwed with a bolt 52. Then each threaded portion 51 can stay on a link of the chain 3 without loosening off the link. In case the chain 3 is added to prolong the side ropes 1, it can also be connected with the auxiliary crosswise bent bars 5 to supplement the antislippery force of the prolonged section so that the tire can be prevented from slipping on a snow-covered road.

What is claimed is:

1. A tire chain for a tire comprising:
   two respective side ropes which are placed around respective side edges of the tire, each said side rope having a rope eye at each end;
   a plurality of crosswise bent bars which are connected crosswise and spaced apart between said side ropes;
   a metal chain made of a plurality of links which crosses the circumferential surface of the tire twice and which penetrates each of said rope eyes, said metal chain including first and second ends;
   a connector which connects a link at said first end of said chain to a link at said second end of said chain; and at least one auxiliary crosswise bent bar which is connected crosswise between links of said metal chain located on opposite sides of the tire, said auxiliary bent bar including respective threaded ends which pass through a respective said link and respective bolts which are received on a respective threaded end to prevent withdrawal of said respective threaded end through said respective link.

2. A tire chain as claimed in claim 1 wherein each said bent bar has a bent wave shape with a protruding section which protrudes up and away from the circumferential surface of the tire when mounted thereon.

3. A tire chain as claimed in claim 1 wherein said connector includes two grips which are pushed toward one another to release both said connected links.

* * * * *